(12) United States Patent
Rustad et al.

(10) Patent No.: US 6,508,898 B1
(45) Date of Patent: Jan. 21, 2003

(54) HEAT STABLE SELF-SEALING TIRE LINER

(75) Inventors: Norman E. Rustad, Seal Beach, CA (US); Juanito G. Santero, Lawndale, CA (US)

(73) Assignee: ARNCO, South Gate, CA (US)

( * ) Notice: Subject to any disclaimer, the term of this patent is extended or adjusted under 35 U.S.C. 154(b) by 0 days.

(21) Appl. No.: 09/389,650

(22) Filed: Sep. 2, 1999

(51) Int. Cl.⁷ .......................... B29D 30/00; B60C 19/12
(52) U.S. Cl. ........................ 156/115; 152/502
(58) Field of Search .................. 152/502, 503, 152/504; 156/97, 115; 523/166; 428/912; 264/36.14; 528/51; 524/141, 143, 709, 710, 713, 589, 590

(56) References Cited

U.S. PATENT DOCUMENTS

| | | | |
|---|---|---|---|
| 3,628,585 A | 12/1971 | Pace | 152/347 |
| 3,881,537 A | 5/1975 | Miyazato | 152/347 |
| 3,981,342 A | 9/1976 | Farber et al. | 152/347 |
| 4,094,353 A | 6/1978 | Ford | 152/310 |
| 4,115,172 A | 9/1978 | Baboff et al. | 156/115 |
| RE29,890 E | 1/1979 | Gomberg | 152/313 |
| 4,230,168 A | 10/1980 | Kaneda et al. | 152/310 |
| 4,262,624 A | 4/1981 | Soeda et al. | 118/44 |
| 4,398,492 A | 8/1983 | Casey | 118/105 |
| 4,416,844 A | 11/1983 | Wyman | 264/267 |
| 4,418,093 A | 11/1983 | Gomberg et al. | 427/8 |
| 4,683,929 A | 8/1987 | Wyman | 152/313 |
| 5,070,138 A | 12/1991 | Bulluck | 524/871 |
| 5,099,900 A | 3/1992 | Gomberg | 152/503 |
| 5,110,629 A | 5/1992 | Gomberg et al. | 427/322 |
| 5,402,839 A | 4/1995 | Gupta | 152/313 |
| 5,472,031 A | 12/1995 | Austin | 152/415 |
| 5,679,205 A | 10/1997 | Marks | 156/406.6 |
| 5,908,894 A | * 6/1999 | Genz et al. | 524/590 |

FOREIGN PATENT DOCUMENTS

EP  134455 A1  * 3/1985

* cited by examiner

*Primary Examiner*—Geoffrey L. Knable
(74) *Attorney, Agent, or Firm*—Coudert Brothers LLP

(57) ABSTRACT

A very soft polyurethane composition is provided having a low level of an aromatic phosphate or phosphonate plasticizer that will perform well as a self-sealing liner to flat-proof pneumatic tires, and will withstand the high temperatures of the tire retread process and still be functional. The liner is produced by a method of meter-mixing an isocyanate component and a high molecular weight polyol component system that can be poured directly into the tire to be lined as it is being rotated to spread the material uniformly in the tire until it sets up and will not cold flow. Also, the meter-mixed liner material can be poured on a flat surface of release paper to form sheet stock that can be cut into strips and then applied to the inner lining of the tire at a later time.

6 Claims, No Drawings

HEAT STABLE SELF-SEALING TIRE LINER

FIELD OF THE INVENTION

The present invention relates to a self-sealing polyurethane liner for placement inside a pneumatic tire carcass just behind the tread to flat-proof the tire. More particularly, this invention relates to a composition that will not only flat-proof the tire but will withstand temperatures as high as about 290° F. for several hours, such that the tire can be retreaded without causing the liner to lose its usefulness.

BACKGROUND OF THE INVENTION

The pneumatic tire has proven its worth in providing a comfortable ride with load carrying capabilities for automobiles, trucks, aircraft, and other vehicles. However, the tire carcass is susceptible to punctures which cause the tire to go flat, rendering it unusable. A tire suddenly going flat can be life threatening as well as inconvenient and cause financial loss in industrial applications.

Very soft polyurethane elastomer-filled, deflation-proof pneumatic tires were developed beginning in the 1970's to reduce the downtime caused by flats in many industrial applications. A few of the prior art references in this field include: Gomberg, U.S. Pat. Re. 29,890; Wyman, U.S. Pat. No. 4,416,844; Wyman, U.S. Pat. No. 4,683,979; Ford, U.S. Pat. No. 4,094,353; Kaneda et al., U.S. Pat. No. 4,230,168; Bulluck, U.S. Pat. No. 5,070,138; and Gupta, U.S. Pat. No. 5,402,839.

Although the polyurethane filling materials give a harder ride than air, and add, in some cases, tremendous weight to the vehicle, the availability of deflation-proof tires is economically practical for many applications, such as mining, scrap yards, military, and heavy construction.

Since air is negligible in weight and essentially free, the raw materials used in the compositions to fill the tires and to create the extra weight have to be inexpensive to make deflation-proof tires practical.

Besides filling the tire completely, it has been found that flat-proofing can be accomplished with much less material using a very soft self-sealing elastomer as a liner adhering to the inside of the tire carcass just behind the tread. Some prior art references to these materials and application of these materials to the tire carcass include: Pace, U.S. Pat. No. 3,628,585; Miyazato, U.S. Pat. No. 3,881,537; Farber et al., U.S. Pat. No. 3,981,342; Davis et al., U.S. Pat. No. 4,396,053; Casey, U.S. Pat. No. 4,398,492; Soeda et al., U.S. Pat. No. 4,262,624; Baboffet al., U.S. Pat. No. 4,115,172; Austin, U.S. Pat. No. 5,472,031; Gomberg et al., U.S. Pat. No. 4,418,093; Gomberg, U.S. Pat. No. 5,099,900; and Gomberg et al., U.S. Pat. No. 5,110,629.

Specifically, the '629 patent discloses a method for preparing the inner surface of a pneumatic tire for adhesion of a self-sealing tire liner. The composition of the liner is any polyurethane elastomeric material known in the art. Specifically, the method comprises coating the rubber surface with a polyamine, a peroxide solution with a polyisocyanate, and then a prior art uncured liquid or paste urethane formulation is applied to the polyisocyanate coating and allowed to cure. The bond strength of the urethane formulation to the rubber, even at elevated temperatures, e.g., up to 293° F., is said to be improved by such a method. There is no teaching in this patent on the effect such a temperature has on the polyurethane elastomeric liner.

The '053 patent from the above list is directed to a curable storage-stable sealant composition for pneumatic tires containing a liquid low molecular weight hydroxy terminated polybutadiene diol, an antioxidant, a polymeric isocyanate, a tackifier or plasticizer and a catalyst. The plasticizer is included in the composition in amounts in the range of 1 to 10 weight % and is, for example, a thermoplastic hydrogenated rosin ester such as Foral 85.

The tire liner elastomer has to be liquid as it is centrifugally cast in a rotating tire, and then set to a very soft, tacky rubber capable of sealing any hole poked or cut into it. To be economically practical, the tire liner material must be easy to process and set up in a short period of time, yet not too fast, to allow a uniform layer of liner to cover the inside of the tire. The liner must adhere well to the inner carcass of the tire and be stable to creep and flow under any conditions the tire may endure. Since under normal driving conditions the temperatures in the tire can reach 200° F., most liner systems used today are required to withstand this heat for several hours and maintain their integrity. However, some tires in industrial applications, for economical savings, are retreaded. The retreading process requires temperatures up to 285° F. for several hours. Thus, for the liner to be used in tires that will be retreaded, the liner will have to withstand this high temperature cycle without degradation which will result in material flow. The prior art materials being used today will withstand the 200° F., but not the 285° F. heat cycle. Very soft polyurethane elastomers of the prior art will flow at 285° F. in a short time period. There is long felt need for a self-sealing tire liner that will not flow at temperatures of about 290° F.

SUMMARY OF THE INVENTION

The present invention provides a very soft polyurethane composition which includes low levels of a phosphorous-containing plasticizer. The composition of the present invention will perform well as a self-sealing liner to flat-proof pneumatic tires, and will withstand the high temperatures of the tire retread process and still be functional. The liner is prepared by meter-mixing a two component system in the presence of a catalyst and poured directly into the tire to be lined as it is being rotated to spread the material uniformly in the tire until the mixture cures, i.e., sets up so that it will not cold flow. Also, the meter-mixed liner material can be poured on a flat surface of release paper to form sheet stock that can be cut into strips of suitable width and thickness and then applied to the inner lining of the tire by suitable means at a later time.

The composition of the present invention comprises from about 4 to about 15 parts by weight of an isocyanate; from about 10 to 30 parts by weight of a plasticizer blend of which about 4 to about 20 parts by weight of a phosphorous-containing plasticizer including aromatic phosphates, aliphatic phosphonates, and mixtures thereof; and an amount to bring the amount of high molecular weight polyols or blend of polyols, as described in more detail below, to bring the total amount of cured mixture to 100 parts by weight. Parts by weight as used herein is based on a total of 100 parts of the cured mixture of the present invention.

The soft polyurethane elastomer composition of this invention can be formulated to provide a two component system of an isocyanate component and a polyol component that can be meter-mixed at a 1:1 volume ratio at room temperature to produce a mixture that will flow easily with gravity and centrifugal forces for a short period to level and then gel and set up in less than 15 minutes to form an elastomer that will not cold flow. To insure that the liner adheres to the inner lining of the tire, the inner surface of the tire is wiped clean with a cleaning solvent, dried, and coated with an appropriate primer. After a short curing period in the presence of a catalyst, the liner composition containing the aromatic phosphates or phosphonates will be non-flowing, self-sealing to prevent punctures from causing air loss of the tire and will not degrade in utility at temperatures as high as about 290° F. for a number of hours.

DESCRIPTION OF THE PREFERRED EMBODIMENTS OF THE INVENTION

In order for a tire liner flat-proofing system to be economically practical, it has to be inexpensive as well as perform under severe service conditions. Though the liner approach requires much less material to flat-proof a tire than a standard tire filling system, which fills the entire tire, it is still important that the raw materials be inexpensive and the process for putting the system into the tires be very simple and inexpensive. This requires very basic equipment that meters at a 1:1 ratio, and a two component system that has both components, the isocyanate side and the polyol side, at a reasonably low viscosity at processing temperatures. In most cases the temperature for processing will be between about 70° to about 90° F. Also, the viscosity of the two component mixture has to be low, such that it will flow readily as the tire is rotated at 40–100 rpm to spread uniformly within the tire. Once the liner has been centrifugally cast to an uniform covering on the inner side of the tire carcass behind the tread, it has to set up rapidly, in less than 15 minutes, to a non-flowing elastomer. Gomberg et al., U.S. Pat. No. 4,418,093, describes a method and one type of apparatus for centrifugally casting a urethane elastomeric liner to the tire carcass. Baboff et al., U.S. Pat. No. 4,115,172, describes another type of apparatus and method for applying a self-sealing material to serve as a tire carcass liner. The foregoing descriptions are incorporated herein by reference.

Many of the prior art tire liner systems are very soft, tacky materials, have a hardness Shore 00 approximately 20–60, that are self-sealing and have good stability up to 200° F. Since a pneumatic tire will not develop a temperature above 200° F. during normal operating conditions, these systems performed quite adequately. The prior art systems flat-proofed the tire by sealing any punctures, and at temperatures up to 200° F., they maintained their integrity and did not flow. However, in many industrial applications where special tires are required and can be expensive, it is economically practical to retread these tires for longer life. The retread process requires a temperature of 285° F. for several hours. At this temperature, the prior art self-sealing systems will flow and degrade, and as a result will lose their usefulness as a puncture sealer.

The solution to the foregoing problem is to add aromatic phosphates and phosphonates to the two component mixture. They include but are not limited to diphenylcresyl phosphate, tricresyl phosphate, diphenyl isodecyl phosphate, diphenyl-2-ethylhexyl phosphate, isopropylphenyl diphenyl phosphate, t-butylphenyl diphenyl phosphate and dimethyl methylphosphonate.

Polyisocyanates known and used in the art of forming polyurethane compositions can be employed in the compositions of the present invention. Examples of such isocyanates include 4,4'-diphenylmethane diisocyanate, p-phenylene diisocyanate, 3,3'-dimethyl- 4,4'-diphenyl diisocyanate, toluene diisocyanate, 2,2', 5,5'-tetramethyl-4, 4'-diphenylisopropylidene diisocyanate, and 1,5-naphthylene diisocyanate. The preferred isocyanates that can use used are diphenyl methane diisocyanate types with a functionality of about 2 or close to 2. Commercially available polyisocyanate quasi prepolymers that can be used include: Rubinate 1027 supplied by Huntsman and Baytec ME230 supplied by Bayer.

The polyols useful in the composition of the present invention include a blend of high molecular weight hydroxy (OH) terminated polyether triols and diols. A large variety of polyols are available and are obtained by polymerization of an alkylene oxide, such as ethylene oxide, propylene oxide, or butylene oxide with a glycol. Polyethers having higher functionality may be obtained by the reaction with a triol or higher polyol, such as glycerine, trimethylol propane, and pentaerythitol. Because a standard high molecular weight polypropylene glycol diol (>2000 MW) cannot be made with a functionality near or about 2 which is used in the blend in the present composition, a high MW diol made with newly developed technology by BASF and Lyondell is used. Similarly, standard 6000 MW triols have an actual functionality about 2.2–2.4 rather than 3. A 6000 MW triol with a functionality of approximately 2.9 can be made with the new technology and are used in the blends of the present composition. The high MW polypropylene glycol diol useful in the present composition have hydroxyl numbers in the range of 13 to 25 and a hydroxyl functionality of approximately 2. Triols for the blend are the high MW triols having a hydroxyl number in the range of about 24 to about 31 and a hydroxyl functionality in the range of about 2.2 to about 2.9. Particularly useful triols have a hydroxyl number in the range of 26.5 to 29.5 or a hydroxyl equivalent weight in the range of 1900 to 2100. Polyols of the above types are available commercially, for example, under the VORANOL trademark from Dow Chemical Company, ARCOL and ACCLAIM trademarks from Lyondell Chemical Company, POLY-G trademark from Arch Chemicals, MULTRANOL trademark from Bayer Corporation, and PLURACOL and PLURACOL HP trademarks from BASF Corporation.

A catalyst is added to promote the rate of cure to provide a reasonable potlife and a reasonable cure rate at ambient temperatures, approximately 70° F. Any of the catalysts known in the production of polyurethane elastomers can be used. Examples include tertiary amine catalysts, or dibutyl-tin dilaurate or other organotin catalysts. A high performance organotin catalyst that has been used in curing the compositions of the present invention is FORMREZ UL-22 sold by Witco Chemical Company.

Antioxidants, fillers, extenders, pigments, and other additives that are well known in the art can be included in the polyurethane compositions of the present invention. To produce soft elastomers, i.e., having a Shore 00 between 5 and 60, and maintain a 1 to 1 ratio, additional plasticizers other than phosphorous-containing plasticizers are used in either the isocyanate component or both the isocyanate and polyol components. Examples of such additional plasticizers include diester plasticizers, such as dioctyl phthalate, KODAFLEX TXIB supplied by Eastman Chemical Company, SANTICIZER 160 supplied by Monsanto Chemical Company, and BENZOFLEX 9–88 supplied by Velsicol Chemical Corporation; naphthenic, paraffinic, or catalytically cracked process oils; and mineral oils.

CONTROLS 1–3 AND EXAMPLES 1–6

The following examples, controls or comparative examples, and discussion further illustrate the superior performance of the self-sealing compositions of the present invention compared with the comparative examples. The controls and examples are for illustrative purposes and are not meant to limit the scope of the claims in any way.

The tire liner composition for each of the examples and controls was a two component polyurethane elastomer system metered at a 1:1 by volume ratio and mixed through a static mixer as it was pumped into a rotating tire to set up and cure at room temperature. One component was a polyisocyanate mixture and the second component was a polyol blend. Each component was made by blending proportionately the specific amounts of the preferred materials listed in the tables below. Table 1 gives the practical examples illustrating the useful systems of the compositions of the present invention, and Table 2 gives the comparative examples.

The following tabulates the specific materials used in each of the isocyanate and polyol components listed in Tables 1–2 below:

Polyol A: 6000 MW triol, high functionality, such as Arcol E-785 supplied by Lyondell Chemical Polyol B: 8000 MW diol, such as Acclaim 8200 supplied by Lyondell Chemical Polyol C: 6000 MW triol, high functionality, such as Acclaim 6320 supplied by Lyondell Chemical Isocyanate A: Rubinate 1027 supplied by ICI Isocyanate B: Baytec ME230 supplied by Bayer Plasticizer A: Texanol Isobutyrate (TXIB) supplied by Eastman Chemical Plasticizer B: Diphenylcresyl Phosphate, such as Phosflex 71B supplied by AKZO Nobel or Disflamoll DPK supplied by Bayer Plasticizer C: Tricresyl Phosphate, such as Disflamoll TKP supplied by Bayer Plasticizer D: Diphenyl Isodecyl Phosphate, such as Phosflex 390 supplied by AKZO Nobel Plasticizer E: Tri-2-ethylhexyl Phosphate, such as Disflamoll TOF supplied by Bayer Plasticizer F: Dimethyl Methylphosphonate, such as Fyrol DMMP supplied by AKZO Nobel Antioxidant: Hindered phenol, such as Irganox 245 supplied by Ciba Geigy Catalyst: Fomrez UL-22 supplied by Witco

TABLE 1

|  | Example 1 | Example 2 | Example 3 | Example 4 | Example 5 | Example 6 | Example 7 |
|---|---|---|---|---|---|---|---|
| Isocyanate Component |  |  |  |  |  |  |  |
| Polyol A | 5 | 5 | 5 | 5 | 5 | 5 | 5 |
| Polyol B | 56 | 56 | 56 | 56 | 56 | 56 | 48 |
| Isocyanate A | 9 | 9 | 9 | 9 | 9 | 9 |  |
| Isocyanate B |  |  |  |  |  |  | 10.5 |
| Plasticizer A | 25 | 25 | 25 | 25 | 25 | 25 | 29.5 |
| Plasticizer B | 5 |  |  |  | 5 | 5 | 5 |
| Plasticizer C |  | 5 |  |  |  |  |  |
| Plasticizer D |  |  | 5 |  |  |  |  |
| Plasticizer F |  |  |  | 5 |  |  |  |
| Polyol Component |  |  |  |  |  |  |  |
| Polyol A | 15 | 15 | 15 | 15 | 15 | 30 | 45 |
| Polyol C | 78.7 | 78.7 | 78.7 | 78.7 | 80.7 | 63.7 | 48.7 |
| Plasticizer B | 5 |  |  |  | 3 | 5 | 5 |
| Plasticizer C |  | 5 |  |  |  |  |  |
| Plasticizer D |  |  | 5 |  |  |  |  |
| Plasticizer F |  |  |  | 5 |  |  |  |
| Antioxidant | 1 | 1 | 1 | 1 | 1 | 1 | 1 |
| Catalyst | 0.3 | 0.3 | 0.3 | 0.3 | 0.3 | 0.3 | 0.3 |
| Mix Ratio by Weight | 100/100 | 100/100 | 100/100 | 100/100 | 100/100 | 100/100 | 98/100 |
| Hardness Shore 00 | 40–60 | 40–60 | 40–60 | 40–60 | 40–60 | 40–60 | 40–60 |
| Flow at 285° F. | No | No | No | No | No | No | No |

TABLE 2

|  | Comparative Example 1 | Comparative Example 2 | Comparative Example 3 | Comparative Example 4 |
|---|---|---|---|---|
| Isocyanate Component |  |  |  |  |
| Polyol A | 5 | 5 | 5 | 5 |
| Polyol B | 56 | 56 | 56 | 56 |
| Isocyanate A | 9 | 9 | 9 | 9 |
| Isocyanate B |  |  |  |  |
| Plasticizer A | 30 | 25 | 27 | 15 |
| Plasticizer B |  |  | 3 |  |
| Plasticizer E |  | 5 |  | 15 |
| Polyol Component |  |  |  |  |
| Polyol A | 15 | 15 | 15 | 15 |
| Polyol C | 78.7 | 78.7 | 80.7 | 78.7 |
| Plasticizer A | 5 |  |  |  |
| Plasticizer B |  |  | 3 |  |
| Plasticizer E |  | 5 |  | 5 |
| Antioxidant | 1 | 1 | 1 | 1 |
| Catalyst | 0.3 | 0.3 | 0.3 | 0.3 |
| Mix Ratio by Weight | 100/100 | 100/100 | 100/100 | 100/100 |
| Hardness Shore 00 | 40–60 | 40–60 | 40–60 | 40–60 |
| Flow at 285° F. | Yes | Yes | Yes | Yes |

The isocyanate component was made by blending the polyols and plasticizers into the isocyanate and heating the blend to an elevated temperature, i.e., 150° F., with agitation for a period of time to remove volatile materials. After about 2 hours at 150° F. with degassing, the % NCO was 1.8%. The material was packaged in drums, cooled to ambient temperature, and was then ready for processing.

The polyol component was made by dissolving the antioxidant in the polyols and plasticizer at 150° F. and degassing. When the degassing was complete, the catalyst was blended in. The material was packaged in drums, cooled to ambient temperature, and was then ready for processing.

The present invention, using the characteristics of a high molecular weight polypropylene glycol (e.g., 8000 MW) having a hydroxyl number in the range of about 13 to about 16 and with a hydroxyl functionality of very nearly 2 to produce a very soft polyurethane elastomer that has self-sealing properties, and using the high temperature stabilizing characteristics of aromatic phosphates at low levels, forms a tire liner composition that will not flow after exposure to about 290° F. for several hours and will maintain its self-sealing flat-proofing as an uniform liner in a tire. Because a standard high molecular weight polypropylene glycol diol (>2000 MW) cannot be made with a functionality near 2, a high MW diol made with newly developed technology by BASF and Lyondell was used. Also, standard 6000 MW triols have an actual functionality about 2.2–2.4 rather than 3. A 6000 MW triol with a functionality of approximately 2.9 can be made with the new technology and was used. With these blend of polyols, this two component composition has the low viscosities of the two components and the composite mixture meter-mix and process easily to form the tire liner in a practical time.

Comparative Example 1 in Table 2 gives the basic formulation for both components of the tire liner system that formed a self-sealing elastomeric liner having a hardness Shore 00 of about 40. This material will function well at flat-proofing tires under normal conditions, i.e., at temperatures in the tire of no more than approximately 200° F. It was found that at temperatures approaching 285° F. this material broke down and began to flow causing failure of the liner system. However, by incorporating 5% of an aromatic phosphate, such as diphenylcresyl phosphate as shown in Examples 1, 6 and 7, the temperature stability of the liner was unexpectedly improved to allow the liner to be exposed to 285° F. cycles of three hours several times without any evidence of material flow. Besides the diphenylcresyl phosphate used in Example 1, other aromatic phosphates perform similarly, such as tricresyl phosphate in Example 2 and diphenyl isodecyl phosphate in Example 3. However, aliphatic phosphates, such as tri-2-ethylhexyl phosphate, did not work as shown in Comparative Examples 2 and 4. An aliphatic phosphonate, dimethyl methylphosphonate, did perform well as shown in Example 4.

Although the phosphorus-containing phosphates function as plasticizers and stabilizers, they are more expensive than the other plasticizers used to make the soft self-sealing tire liner. Economically, the less the amount of such a plasticizer that is used, the better. Since using 3% diphenylcresyl phosphate as in Comparative Example 3, did not prevent flow and at the 4 weight % level, Example 5, flow was prevented for only one retread cycle, incorporating the aromatic phosphate into the liner formulation at the 5 weight % level is the most economically practical.

Without departing from the spirit and scope of this invention, one of ordinary skill in the art can make various changes and modifications to the invention to adapt it to various usages and conditions. As such, these changes and modifications are properly, equitably, and intended to be, within the full range of equivalents of the following claims.

What is claimed is:

1. A method for producing a heat stable self-sealing pneumatic tire liner, which comprises:

(a) mixing the following two component system:
   (i) an isocyanate component comprising a polyisocyanate; a polyol comprising a blend of a high molecular weight diol having a hydroxyl number in the range of about 13 to about 25, a hydroxyl functionality of about 2 and a high molecular weight triol having a hydroxyl number in the range of about 24 to about 31 with a hydroxyl functionality of about 2.2 to about 2.9; and about 10 to about 30 parts by weight of a plasticizer based on a total of 100 parts of said two component system of a plasticizer of which about 4 to about 20 parts by weight is a phosphorous-containing plasticizer selected from the group consisting of an aromatic phosphate, a phosphonate, and mixtures thereof;
   (ii) a polyol component comprising said polyol; and about 10 to about 20 parts by weight based on a total of 100 parts of said two component system of said plasticizer;

in the presence of a catalyst to form a soft polyurethane elastomer;

(b) curing said elastomer;

(c) recovering a soft polyurethane elastomeric liner composition that is self-sealing in the event of a pneumatic tire puncture and can withstand temperatures of up to about 290° F.; and (d) using the recovered composition as a self-sealing tire liner.

2. The method of claim 1 wherein said phosphorous-containing plasticizer is dimethyl methylphosphonate.

3. The method of claim 1 wherein said phosphorous-containing plasticizer is selected from the group consisting of diphenylcresyl phosphate, tricresyl phosphate, diphenyl isodecyl phosphate, and mixtures thereof.

4. The method of claim 1 wherein said high molecular weight diol has a hydroxyl number in the range of about 13 to about 16, and an actual hydroxyl functionality of about 2.

5. The method of claim 1 wherein said isocyanate is a diphenyl methane diisocyanate with a functionality of about 2.

6. The method of claim 1 wherein said phosphorous-containing plasticizer is selected from the group consisting of dimethyl methylphosphonate, diphenylcresyl phosphate, tricresyl phosphate, diphenyl isodecyl phosphate, and mixtures thereof.

* * * * *